United States Patent [19]

Peiser et al.

[11] 4,312,111
[45] Jan. 26, 1982

[54] TOOL CHANGER FOR VERTICAL SPINDLE MACHINE

[75] Inventors: Adolf E. Peiser, Windsor Locks; Richard I. Latzko, Glastonbury, both of Conn.

[73] Assignee: Colt Industries Operating Corp, West Hartford, Conn.

[21] Appl. No.: 67,240

[22] Filed: Aug. 17, 1979

[51] Int. Cl.³ ............................................ B23Q 3/157
[52] U.S. Cl. ...................................... 29/568; 414/753; 414/779
[58] Field of Search ................ 29/568, 26 A; 414/751, 414/753, 779

[56] References Cited

U.S. PATENT DOCUMENTS

| | | | |
|---|---|---|---|
| 2,907,478 | 10/1959 | Von Zelewsky | 29/568 X |
| 3,384,953 | 5/1968 | Schrolucke | 29/568 |
| 4,156,962 | 6/1979 | Haller | 29/568 |
| 4,237,599 | 12/1980 | Budnauro et al. | 29/568 |

*Primary Examiner*—Z. R. Bilinsky
*Attorney, Agent, or Firm*—Radford W. Luther; Richard A. Dornon

[57] ABSTRACT

A tool changer mechanism for a vertical spindle machining center has a remotely positioned tool storage magazine. Tools are transferred between the magazine and the spindle by a tool transfer assembly which is mounted for reciprocating sliding movement along the side of the machining center. The tool transfer assembly incorporates a pivotally mounted support adapted for vertical movement and a rotatable transfer arm, having two grippers, carried by the support. During reciprocating movement of the tool transfer assembly, the support undergoes a pivoting movement with respect to the assembly while the angular position of the arm with respect to the support remains fixed. As the tool transfer assembly reaches the end of its movement toward the spindle, an empty gripper secures the old tool. The support is then lowered so that the arm may be rotated to place a new tool in the other gripper in alignment with the spindle. When the support is raised, the new tool is inserted in the spindle. The tool transfer assembly is then moved back toward the magazine leaving the new tool in the spindle and carrying the old tool to the magazine.

9 Claims, 29 Drawing Figures

Fig. 11 TOOL TRANSFER STATION

ARM DOWN

Fig. 22

TRANSFER ARM ROTATES

Fig. 23

ARM UP

OLD TOOL REPLACED IN EMPTY TOOL CARRIER

Fig. 24

RACK DISPLACED TO PIVOT SUPPORT ABOUT ELBOW SO THAT TRANSFER ARM CLEARS PATH OF TOOLS IN MAGAZINE

Fig. 25

MAGAZINE SEARCHES AND PLACES NEXT NEW TOOL AT TRANSFER STATION

Fig. 26

GRIPPER SECURES NEXT NEW TOOL AS RACK IS AGAIN DISPLACED

Fig. 27

ARM DOWN

NEXT NEW TOOL REMOVED FROM ITS TOOL CARRIER

Fig. 28

TRANSFER ARM ROTATES

Fig. 29

ARM UP

TRANSFER ARM SUPPORT LOCATED AT PARK POSITION AWAITING A TOOL CHANGE COMMAND

TOOL CHANGER FOR VERTICAL SPINDLE MACHINE

BACKGROUND OF THE INVENTION

This invention relates to automatic tool changers for machine tools, particularly of the vertical spindle type.

In the past, successful tool changers for vertical spindle machining centers having magazines with remotely positioned tool transfer stations have suffered from relative complexity or excessive tool change time. The use of a remote tool transfer station is highly desirable because it permits the provision of a large floor mounted tool storage magazine which does not impose a load upon the other components of the machining center or interfere with machining movements.

SUMMARY OF THE INVENTION

The automatic tool changer of the present invention is primarily useful in connection with machine tools having vertical spindles which are commonly termed machining centers. A tool changer of the invention is particularly advantageous since it permits the utilization of a remote tool transfer station which does not place constraints upon machine movements and allows the accommodation of a large tool storage magazine which is not mounted on the machine nor adjacent the headstock thereof.

In accordance with the invention, a support, which carries a rotatable transfer arm having two grippers (preferably opposed) is adapted to undergo a reciprocating motion (preferably cycloidal) along a side of the machine while simultaneously pivoting. At the end of its forward translation, the support will have pivoted to such an extent that a gripper of the transfer arm may secure a tool in the spindle which has performed its machining tasks. The grasping of a tool in the spindle mandates no rotation whatsoever of the transfer arm because of the pivoting movement of its support, thereby reducing tool change time. Before beginning return movement to the tool transfer station, the tool change is completed by a down movement of the transfer arm to remove the old tool and an up movement of the transfer arm to insert a new tool after a rotation thereof to align the new tool with the spindle.

A salient feature of a tool changer of the invention is the small envelope required for the movements of the tool transfer arm because of the simultaneous translation and pivoting of its support. Since the motions of the transfer arm need not extend far from the machine, operator safety is enhanced and space economies may be readily attained.

It is, accordingly, a primary object of the invention to provide an automatic tool changer for a vertical spindle machine.

Another object is to provide a tool changer for a machine which permits the utilization of a remote tool transfer station.

A further object is to provide a tool changer for a vertical spindle machine whose motions are encompassed by a relatively small envelope.

A still further object is to provide a tool changer having a linearly movable and simultaneously pivotable support which carries a tool transfer arm.

These and other objects and advantages will become more readily apparent from the following detailed description, when taken in conjunction with the accompanying drawings, in which:

DETAILED DESCRIPTION OF PREFERRED EMBODIMENT

Figure 1:
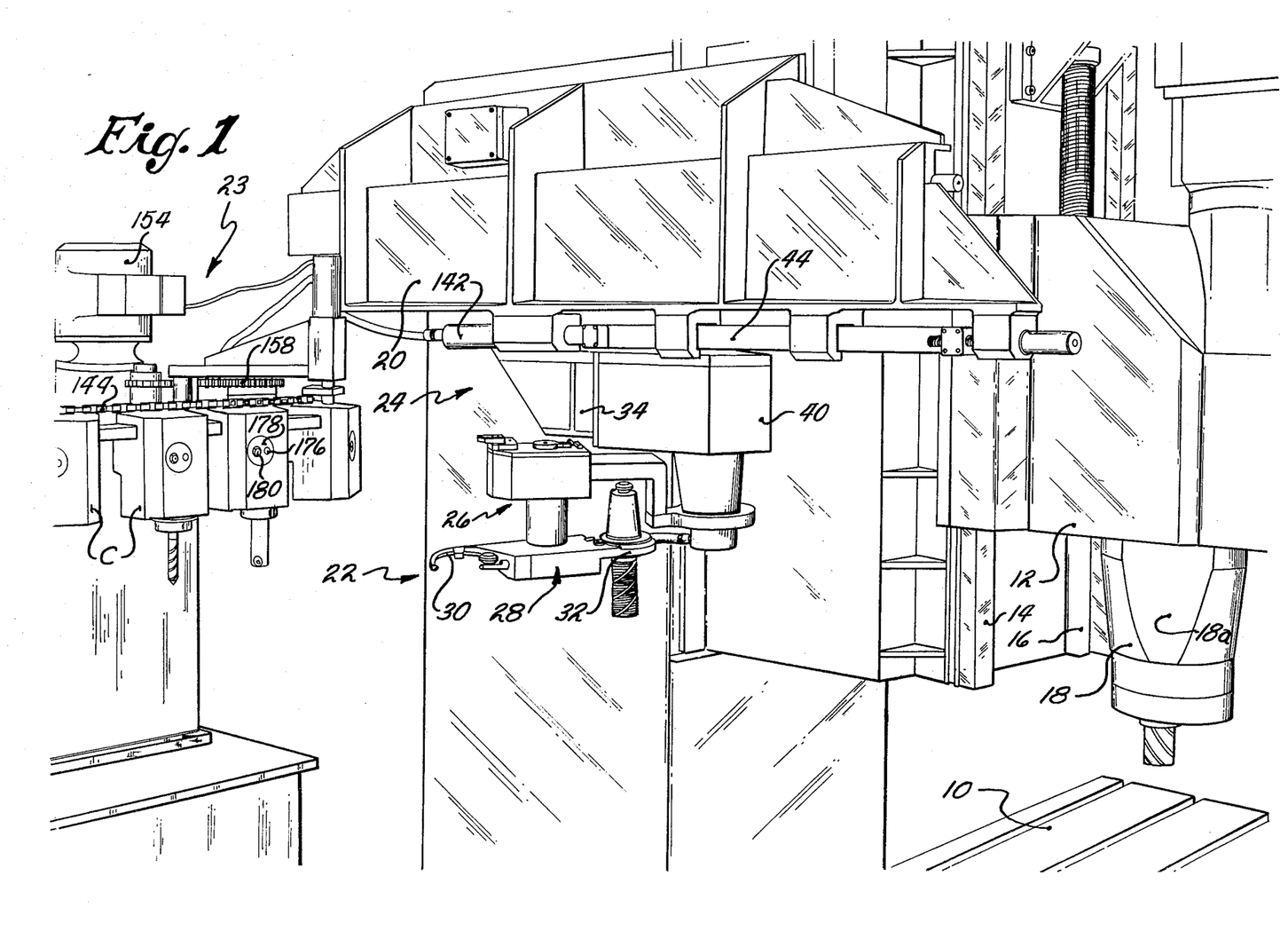
FIG. 1 is a perspective view of a vertical spindle machining center embodying a tool changer of the invention.
Figure 2:
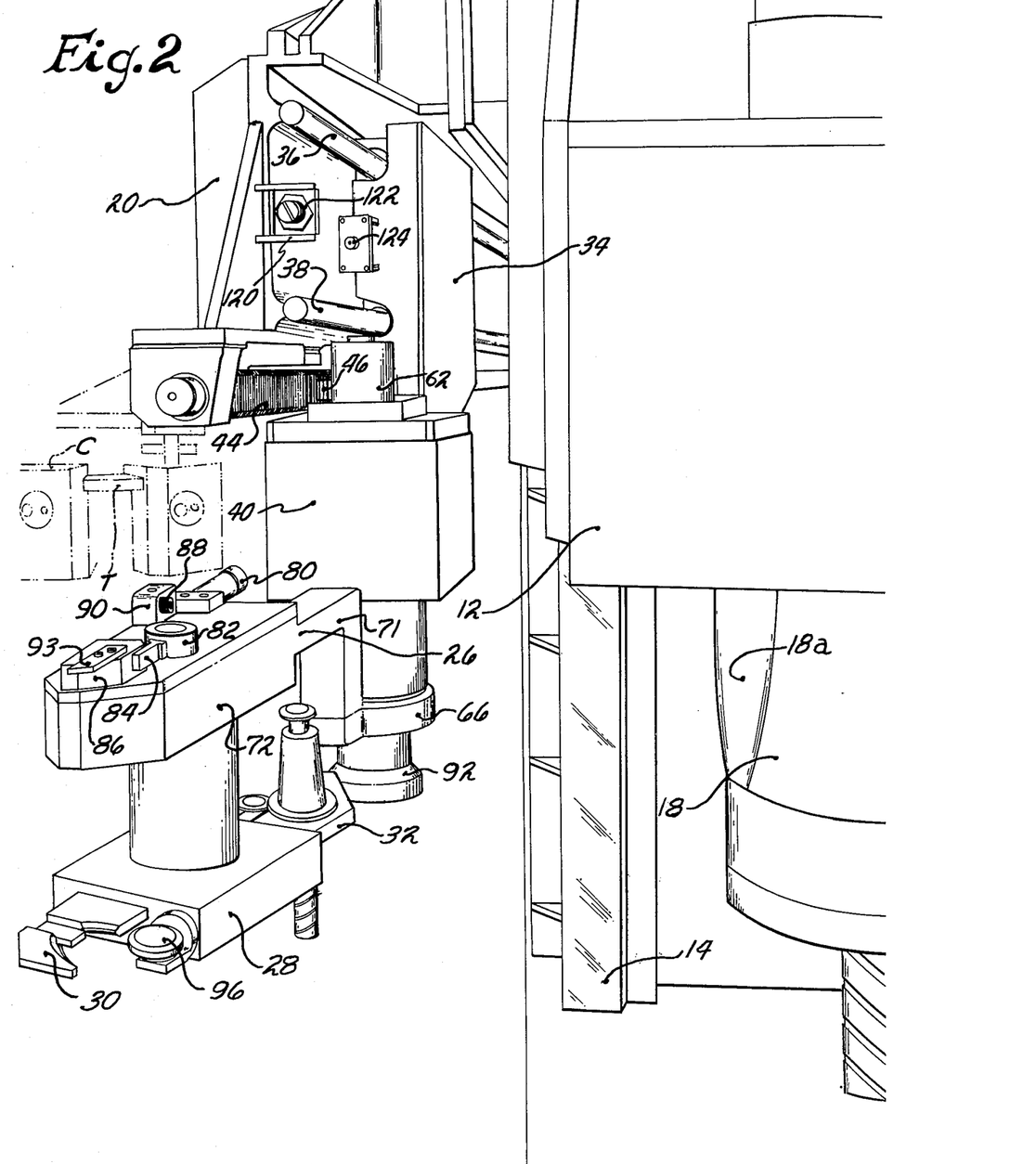
FIG. 2 is another perspective view of the machining center of FIG. 1, taken from the front thereof.

Referring specifically to FIGS. 1 and 2, a preferred tool changer of the invention is depicted in association with a machining center of the vertical spindle type. Such machines, which are well known in the art, are adapted to perform boring, milling, drilling, and tapping operations under numerical control. The machining center, as is customary, has a work table 10 mounted in conventional fashion for movement along two axis. The machining center also includes a vertically movable spindle head 12, mounted upon ways 14 and 16. The spindle head 12 carries a spindle 18, which is adapted to receive the tapered shank of a tool holder with retention knob (which will be hereinafter termed a tool) where it is held by a power drawbar. The spindle head 12 must be moved to a predetermined vertical position in preparation for tool changing since the illustrated tool changer is adapted to remove tools from and insert tools in the spindle at a fixed elevation.

The tool changer assembly of FIGS. 1 and 2 is shown mounted upon the side of the column of the machining center. The basic elements of the tool changer assembly are a frame 20 mounted upon the side of the machine column and a tool transfer assembly 22 supported thereby which reciprocates between the spindle and a remote tool transfer station, carrying tools back and forth. Tools are presented to the tool transfer station by a floor mounted tool storage magazine 23, which is illustrated as comprising an endless rectangular track T about which vertically orientated tool carriers C move. The tool carriers C retain the tools in vertical positions and are adapted to release them for downward withdrawal at the tool transfer station. In addition, the tool carriers C receive used tools through upward insertion at the transfer station. The particular form and type of tool storage magazine utilized with the invention admits of many variations and forms no part of the invention.

In general, the tool transfer assembly 22 comprises a slide assembly, generally shown at 24, a transfer arm support 26 and a transfer arm 28 having diametrically opposed grippers 30 and 32. The slide assembly, itself, is constituted by a carriage 34 mounted for reciprocating movement along rails 36 and 38 connected to the frame (which define a track) and a gear box 40 attached to the carriage 34 for movement therewith. The gear box 40 includes a vertically movable and pivotable splined shaft 42 which carries the transfer arm support 26. The transfer arm 28 is mounted for limited rotation between two index positions upon the transfer arm support 26. It should be noted that the transfer arm support 26 is pivotable about the axis of the splined shaft 42 which may be considered as being an elbow whereas the transfer arm 28 is rotatable about an axis spaced therefrom which may be regarded as a wrist.

Depending from and supported by the frame 20 is a rack 44 whih interacts with the gear box 40 when the tool transfer assembly 22 moves forwardly and rearwardly so as to produce pivoting movements of the splined shaft 42 and, hence, the transfer arm support 26. The rack 14 is positioned below the vertically spaced rails 36 and 38 which are also mounted upon the frame 20. As will be subsequently explained, the rack is axially displaceable over a very small distance to permit the tool transfer arm to move out of park position so that a new tool can be placed at the tool transfer station.

Figure 3:
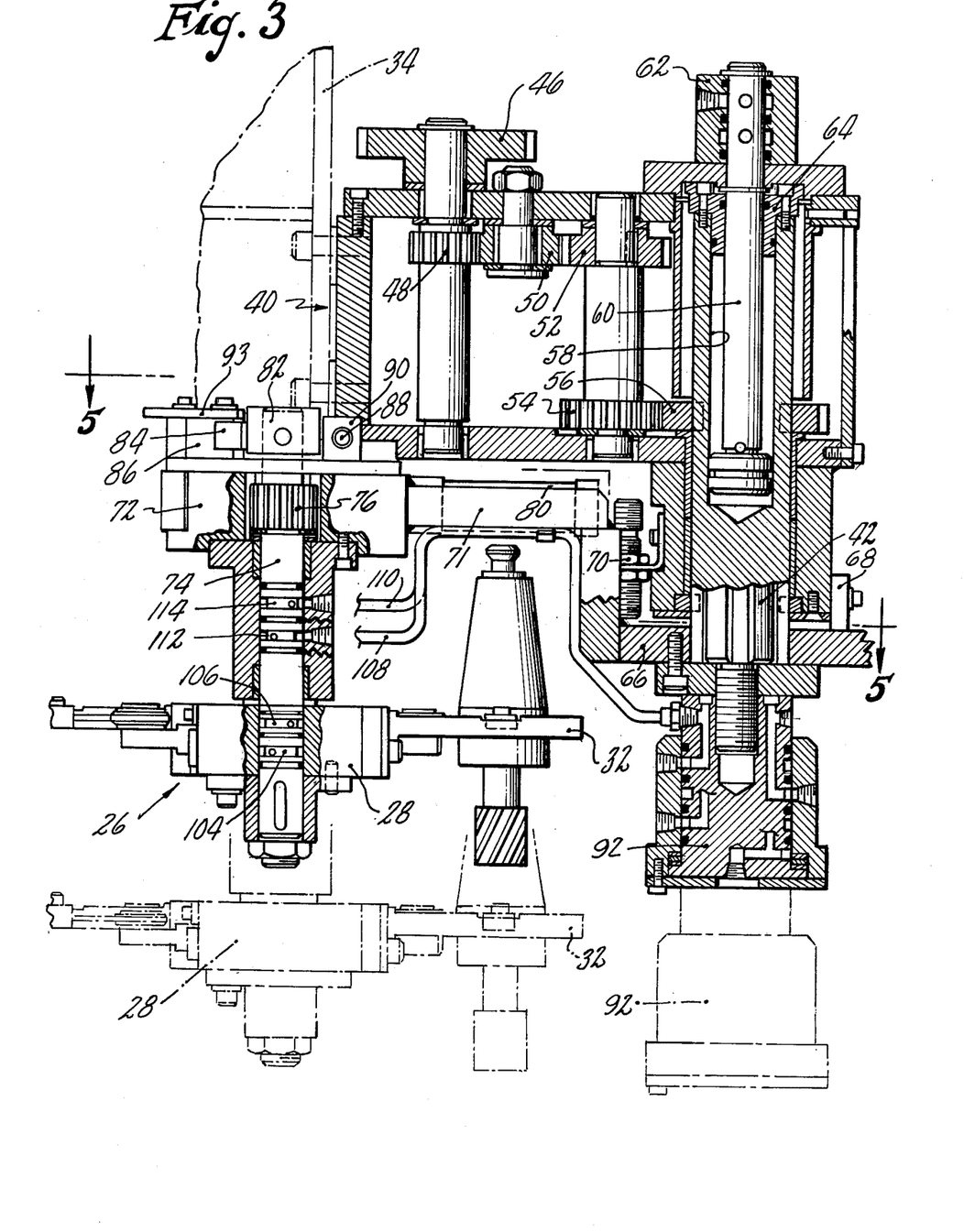
FIG. 3 is a fragmentary sectional side elevational view of the tool transfer assembly showing a portion of the slide assembly, the support, and the transfer arm.

FIG. 3 shows the cooperative relationship between the gear box 40 and the transfer arm support 26 as well as the detailed construction of each of the members. Seated atop the gear box 40 is a pinion 46 which meshes with the rack 44. Motions of the pinion are transmitted through a gear train, comprised of gears 48, 50, 52, 54 and 56, to the splined shaft 42. The gear 56 is connected to the splined shaft 42 such that it produces pivoting thereof as it turns but permits relative axial movement therebetween whereby the splined shaft can be raised or lowered during tool changing operations. The vertical movements of the splined shaft are engendered by hydraulic pressure selectively supplied to a hollow bore 58 therein by a hydraulic supply piston 60 positioned in the bore in sliding engagement with the walls and defining chambers therein. Fluid enters the piston 60 via a hydraulic manifold 62 mounted for rotation on the upper end of the piston. Downward travel of the splined shaft 42 is terminated by the engagement between a cover 64 (attached to the top of the splined shaft 42) and the upper side of gear 56. Upward travel of the splined shaft 42 is terminated by the engagement between a collar 66, which forms part of the transfer arm support and is fixedly mounted at the end of the splined shaft, and an adjustable stop 68 bolted to the gear box. A proximity switch 70 senses the upper position of the splined shaft and another proximity switch extending through the box (not shown) senses the lower shaft position when the cover 64 is adjacent thereto.

The transfer arm support 26 includes an L-shaped bracket 71 fixedly connected to the collar 66 for pivoting therewith and a multi-part housing 72 supported by the horizontal leg of the bracket. In addition, a shaft 74 mounted for rotation within the housing 72 is included in the transfer arm support. The transfer arm 28 is fixedly secured to the lower portion of the shaft 74 for rotation about the axis (the wrist) thereof. Hence, from FIGS. 1, 2, and 3, it should be apparent that the transfer arm 28 pivots about the axis of the splined shaft 42 and the transfer arm 28 rotates about the axis of the shaft 74.

Figure 5:
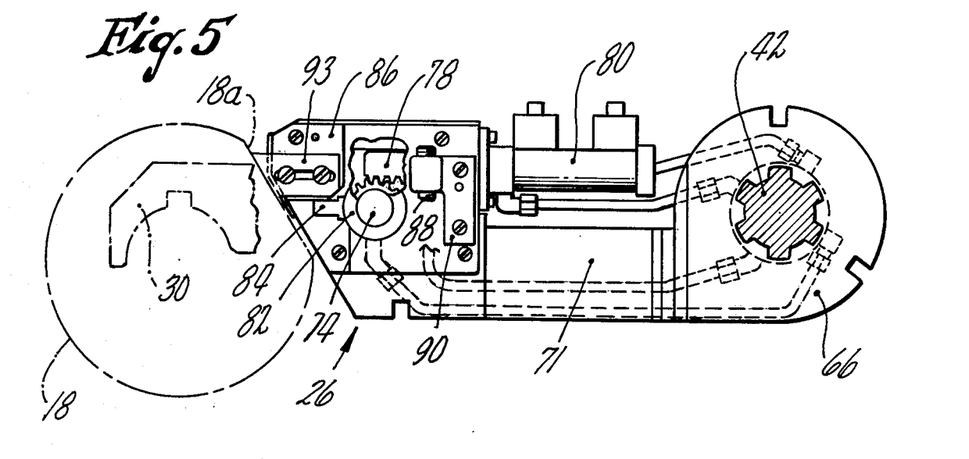
FIG. 5 is a top plan view of the support, taken substantially along the line 5—5 of FIG. 3.
Figures 6, 8, 9:
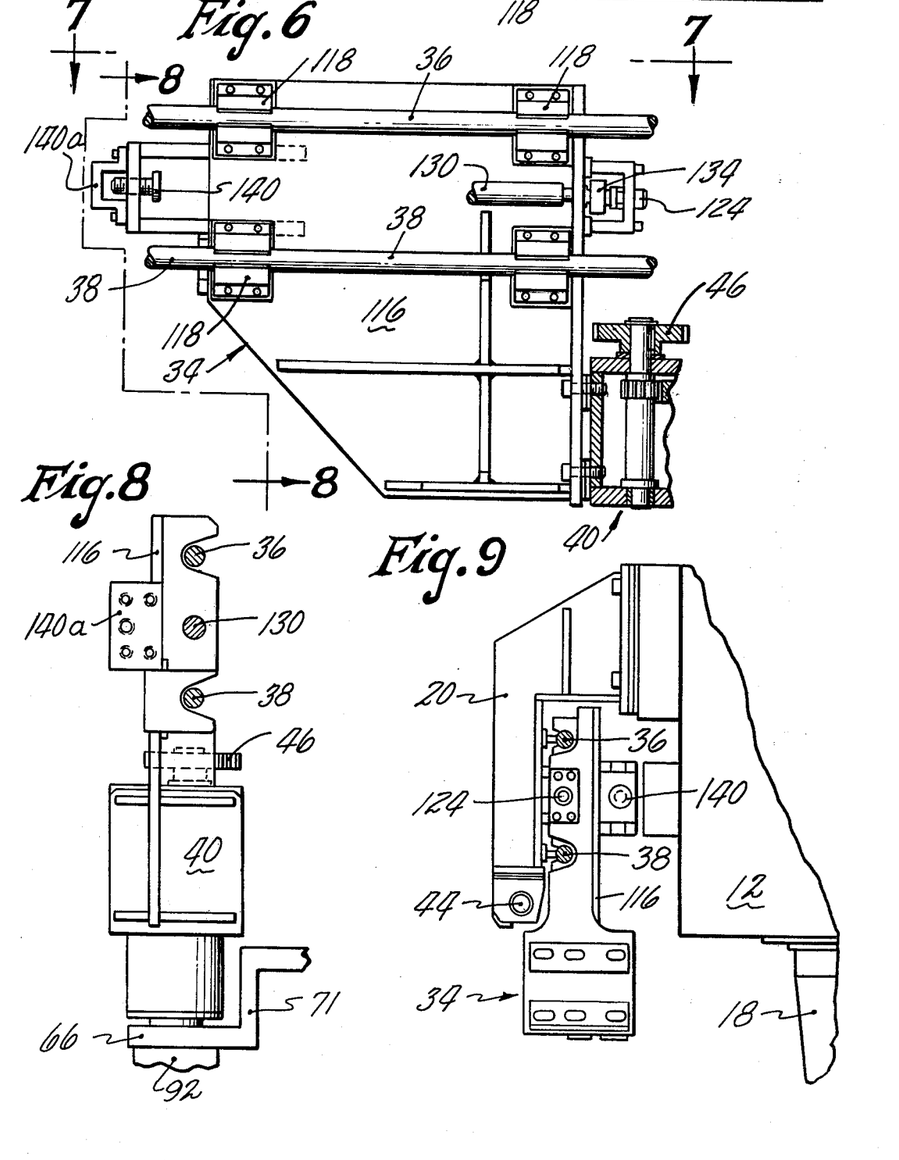
FIG. 6 is a side elevational view of the carriage of the slide assembly showing the manner of its mounting on the machine and its association with the gear box.
FIG. 8 is a rear elevational view of the slide assembly, taken along the line 8—8 of FIG. 6.
FIG. 9 is a front elevational view of the carriage, per se, mounted upon the frame.
Figure 7:
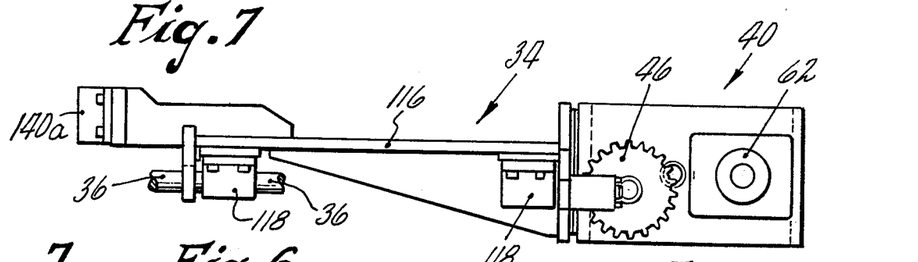
FIG. 7 is a top plan view of the slide assembly, per se, taken along the line 7—7 of FIG. 6.

In order to impart rotation to the shaft 74, and, hence, to the transfer arm 28, the shaft 24 is provided with a coaxial pinion 76 engaged by a rack 78 (FIG. 5) slideably mounted for axial movement in the housing 72. The rack is displaced between left and right positions by a hydraulic cylinder 80 attached to the housing 72. A full stroke of the piston of cylinder 80 produces a 180° rotation of the transfer arm, the stroke being limited in both directions by a stop collar 82 mounted upon the shaft 74 which has a tang adapted to engage a stop block 86 and a screw stop 88 inserted in a stop collar adjustment block 90. Hydraulic pressure for operating the cylinder 80 is furnished by a supply manifold 92 which is mounted upon the underside of the collar 66, as is best shown in FIGS. 3 and 5. A guide 93 mounted upon the housing 72 is adapted to engage the flat side 18a of the spindle housing for maintaining proper alignment of the transfer arm 28 with the spindle during vertical motions of the transfer arm support 26.

Figure 4:
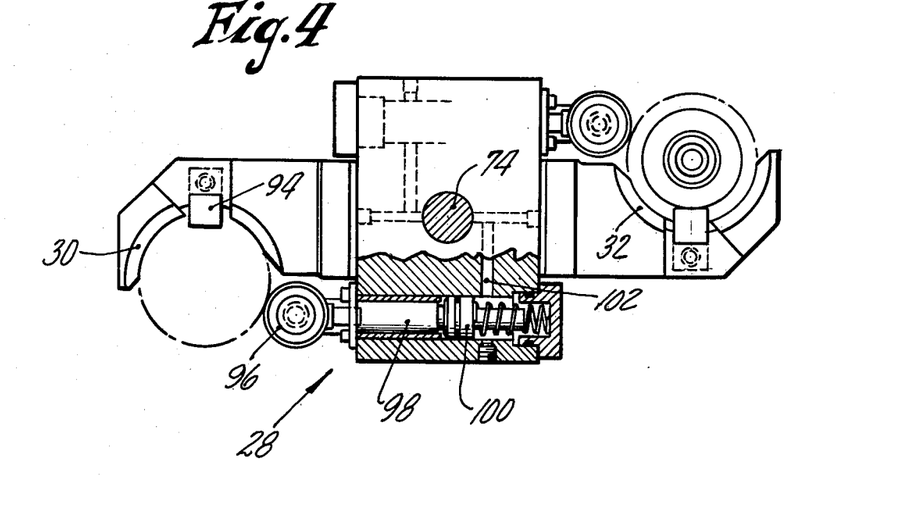
FIG. 4 is a top plan view of the transfer arm, taken substantially along the line 4—4 of FIG. 3.

The transfer arm 28, per se, is depicted in FIG. 4 from which its generally conventional construction may be appreciated. Each of the grippers 30 and 32 have a key 94 for registering with a keyway on a tool and a clamping roller 96 urged into engagement with a tool by a spring loaded shaft 98 mounted in the central portion of the arm. The spring force on the shaft 98 is supplemented by hydraulic pressure ported behind the enlarged diameter portion 100 thereof by passages 102 in the arm which respectively communicate with annuli 104 and 106 on the shaft 74. The annuli are supplied with hydraulic pressure from conduits 108 and 110 via axially extending passages in the shaft 74 which communicate with upper annuli 112 and 114. The conduits 108 and 110 are connected to the manifold 92 as shown in FIGS. 3 and 5.

The carriage 34 of the slide assembly is best illustrated in FIGS. 6, 7, 8, and 9, together with its manner of connection to the gear box 40. The carriage has a frame 116 to which is attached a rectangular array of open-sided pillow blocks 118, each of which is provided with ball bushings and seals at both ends. The upper two pillow blocks slidingly engage the rail 36 and the lower two pillow blocks slidingly engage the rail 38. A stop block 120 having an adjustable set screw 122 is bolted to the frame to define the forward limit of travel of the carriage 34 by its engagement with the surface 124 thereupon. The rearward limit of carriage travel is also defined by a stop (not shown). The carriage 34 is moved forwardly and rearwardly by the shaft 130 of an air cylinder 132 (FIG. 10) mounted upon the frame 20. The end of the shaft 130 is connected to the carriage 34 by means of a flexible coupling 134.

Figure 10:
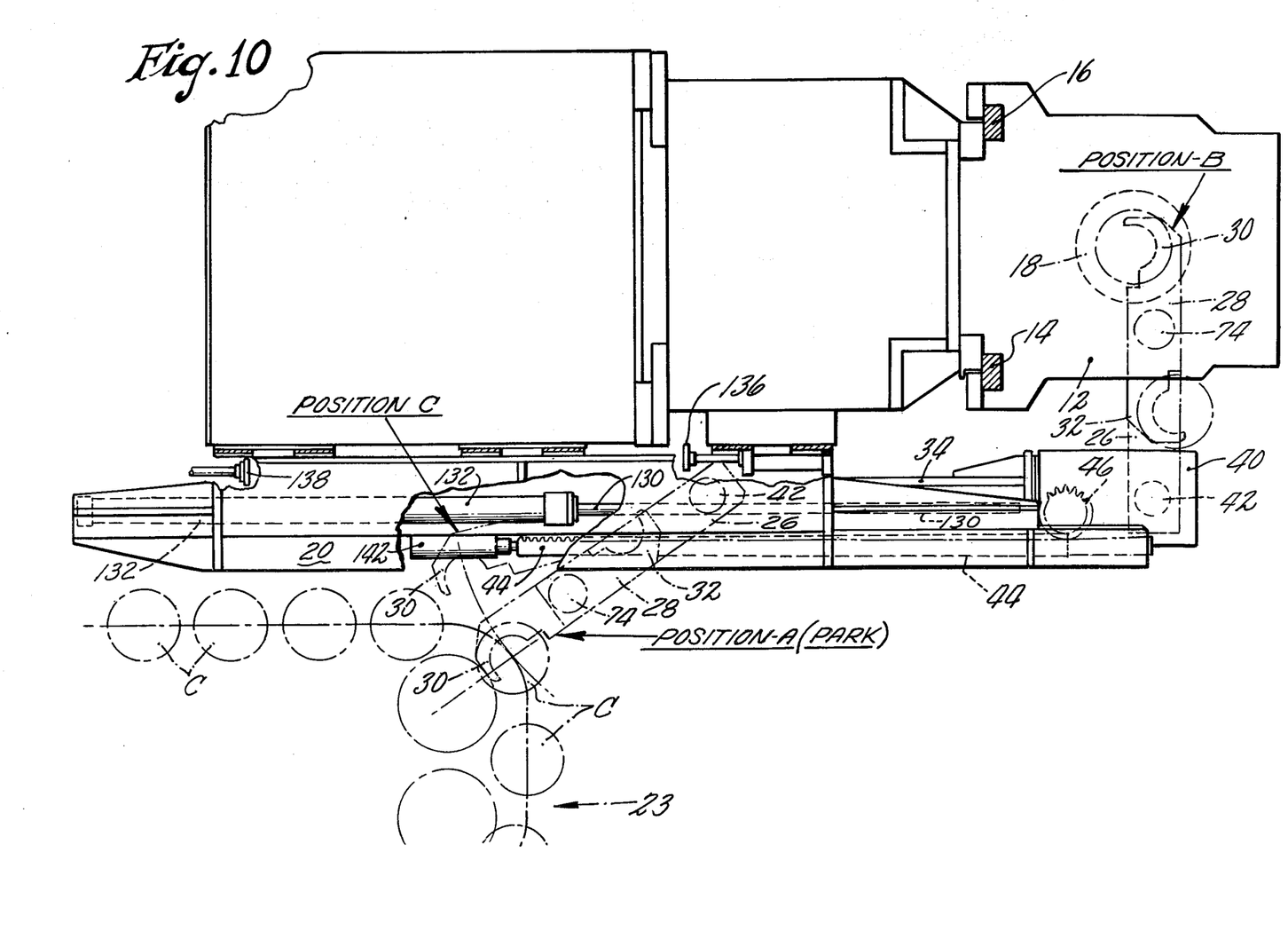
FIG. 10 is a somewhat diagrammatic top plan view of the machining center of FIG. 1.

Turning now to FIG. 10, it will be seen that a shock absorber 136 is mounted upon the machine column for decelerating the carriage 34 as it moves into its forward position. In addition, another shock absorber 138 is provided to decelerate the carriage 34 as it moves into its rearward position. The front and rear shock absorbers are adapted to be respectively contacted by a stop screw 140 integral with the frame 116 of the carriage and a surface 140a.

FIG. 10 is useful in understanding the operation of the illustrated tool changer assembly although a detailed schematic presentation of the mode of operation is provided hereinafter. In position A, the transfer arm support 26 is in its upper parked position with gripper 30 disposed under an empty tool carrier C. This is the at-rest position for the transfer arm support 22 and the transfer arm 28 in which it is awaiting a tool change command. In position B, the tool transfer assembly 22 is in its forward position wherein the transfer arm support 26 has undergone a 235° pivoting movement about the elbow (the axis of the splined shaft 42) and is grasping an old tool in the spindle. The angular extent of the pivoting movement is, of course, directly proportional to the linear displacement of the slide assembly and is generally a matter of design choice.

After changing tools in the spindle, the tool transfer assembly 22 moves back to its rearmost position (while the support 26 undergoes a reverse 235° pivoting movement) and again arrives back at position A. The problem is that, after the old tool is inserted in the empty tool carrier (by an upward movement of the transfer arm support), the transfer arm 28 would be in the path of the tools in the magazine. Hence, a small air cylinder secured to the frame is provided to axially displace the rack 44 (to rotate pinion 46) such that the transfer arm support is pivoted a few degrees (e.g., 21°) to a position where the search for a new tool is not impeded. After the search is completed, the cylinder moves the rack back to its original position whereby a gripper of the transfer arm secures a selected new tool. The carriage 34 will, of course, remain at its rearmost position during all rack displacements.

During movements of the transfer arm 28 between positions A and B, it moves in a cycloidal path, technically termed a prolate cycloid (see FIGS. 13-29). Such an arcuate path has the advantage of pivoting the transfer arm support 26 through a large angle while keeping the outermost gripper relatively close to the machine so as to enhance operator safety. Such a curve is also advantageous since no rotation of the transfer arm, per se, with respect to its support is required during movement toward the spindle to grasp a used tool therein.

Figure 11:
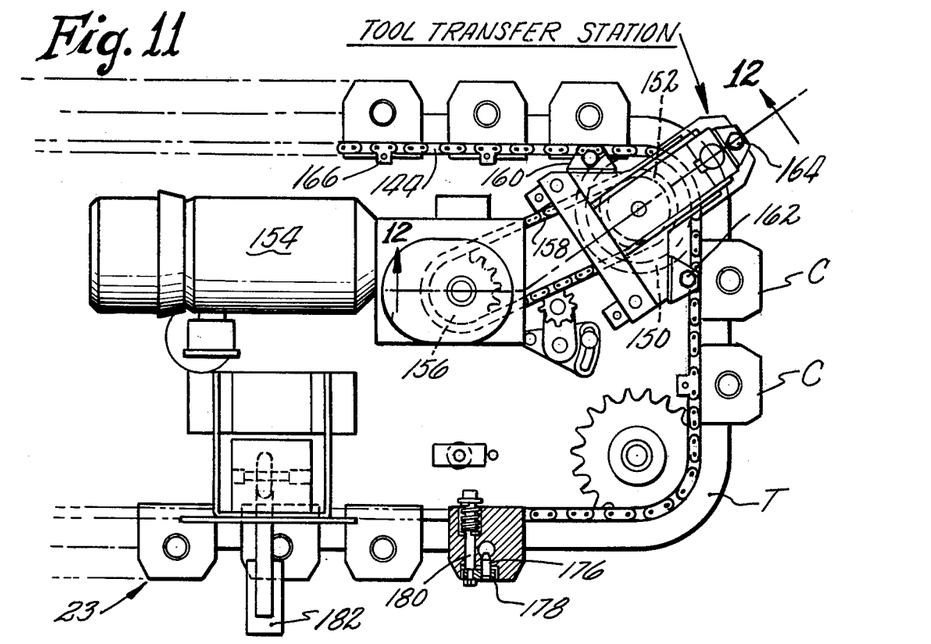
FIG. 11 is a fragmentary top plan view of the tool storage magazine.
Figure 12:
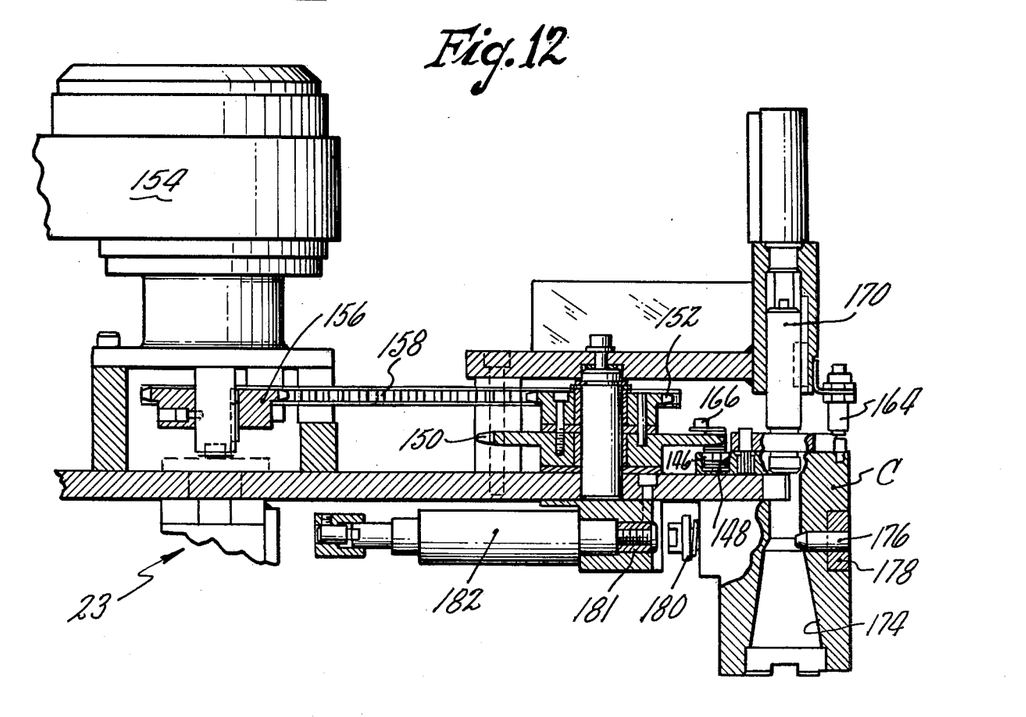
FIG. 12 is a fragmentary sectional side elevational view of the magazine, taken substantially along the lines 12—12 of FIG. 11.
Figure 13:
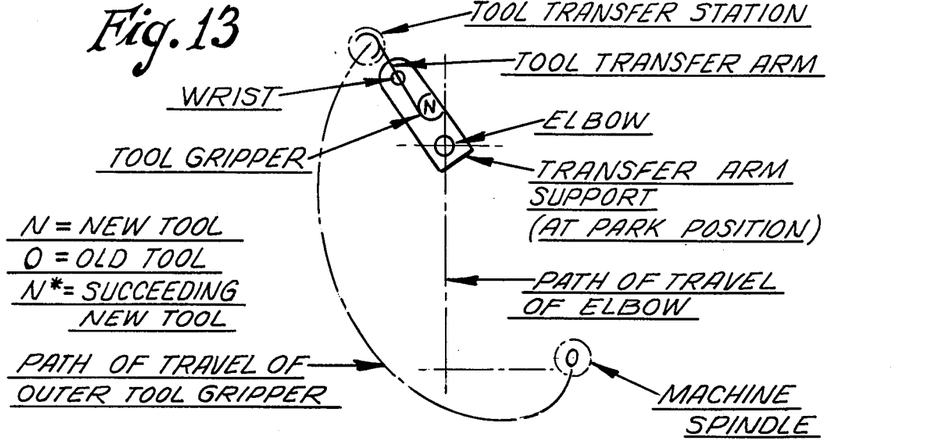
FIGS. 13-29 are schematic views depicting the sequential movements of the tool transfer arm and its support during a tool changing operation.

FIGS. 11 and 12 show the tool storage magazine, which is of a conventional nature, in greater detail. The tool carriers C are driven around the track T by a chain 144 which includes a plurality of rollers 146 received in cavities 148 in the carriers C. The chain 144 is driven by a sprocket 150 which, in turn, is driven by a sprocket 152 mounted thereupon. Sprocket 152 is driven by a motor 154 through sprocket 156 and drive chain 158. The usual proximity switches 160, 162, and 164 are provided to sense the approach of a tool carrier C to the tool transfer station and the arrival of a tool carrier C at the transfer station. Buttons 166 on the chain actuate switches 160 and 162 and the buttons 168 on the tool carriers actuate switch 164. In the tool transfer or home position, a carrier is precisely located and locked thereat by a plunger 170 of an air cylinder 172 which enters a recess in the upper portion of the carrier C.

Each of the tool carriers C has a tapered cavity 174 which is adapted to receive a tool which is held therein by a pin 176 in engagement with the undersurface of the tool retention knob (see FIG. 3) in the top of the tool. The pin 176 is mounted in a disc 178 which is secured to a spring loaded bolt 180 adapted for axial sliding movement. The plunger 181 of an air cylinder 182 located at the tool transfer station functions push bolt 180 inwardly to move the pin 176 so that a tool may be released from or accepted in a carrier at the transfer station. Withdrawal of the plunger, of course, causes the pin 176 to move back into its locking position. A lever 182 at a manual loading station may also be employed to displace the pin 176 for loading or unloading tools.

The operation of the tool changer described heretofore will be explained with reference to FIGS. 13-29, wherein the most efficient method of operating the tool changer assembly is presented. However, it will be understood that the method illustrated admits of many modifications is not the only manner of operating a tool changer assembly of the invention. The operation will be assumed to commence from the park position of the tool transfer assembly 22 (FIG. 13) in which an empty gripper rests at the tool transfer station of the magazine 23 and a new tool is held by the other gripper. It will be remembered that in the park position, the transfer arm 28 and the transfer arm support 26 are in the up position. Also, in the park position the grippers of the transfer arm are at the same level of the gripping flange on the tool in the spindle (in the tool change location of the head 12) which, it will be assumed, is about to complete its machining tasks.

Figure 14:
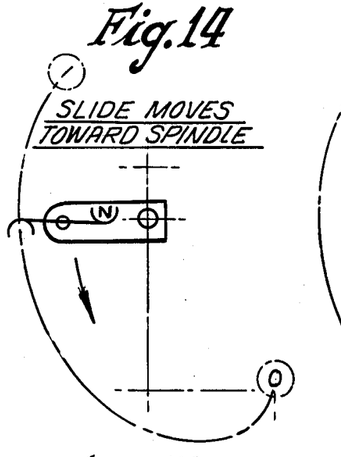
Figure 15:
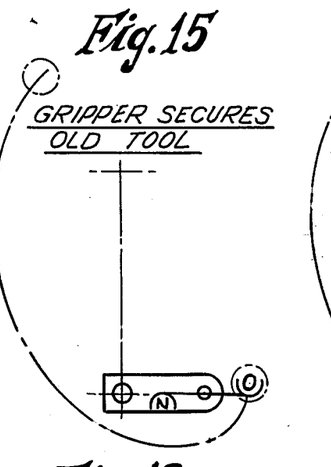

When the machine control commands a tool change after the old tool in the spindle 18 has completed a machining cycle, the head 12 is vertically moved to its tool change position. The air cylinder 132 is then actuated, thereby causing the tool transfer assembly 22 to be pushed forwardly with the carriage 34 sliding over the track defined by rails 36 and 38. During this forward motion, the pinion 46 is caused to rotate by virtue of its meshing engagement with the rack 44. Rotation of the pinion 46, of course, produces a pivoting of the transfer arm support 26 about the elbow (the axis of the splined shaft 42) in proportion to the extent of linear travel of the tool transfer assembly. As shown in FIG. 14, the tool transfer assembly 22 is on its way toward the spindle and the transfer arm support 26 has pivoted through an angle of about 55°. It is important to note that during both forward and rearward movement of the tool transfer assembly 22, the transfer arm 28 never changes its position with respect to its support 26. In FIG. 15, the tool transfer assembly 22 has completed its forward movement (pivoting through a total angle of 235°) and the empty gripper 30 has secured the old tool by engaging the gripper flange thereupon. It will be noted that just prior to engaging the old tool in the spindle, the empty gripper 30 is moving rearwardly at a low velocity.

Figure 16:
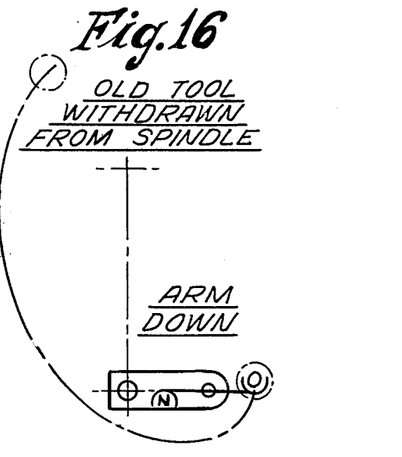
Figure 17:
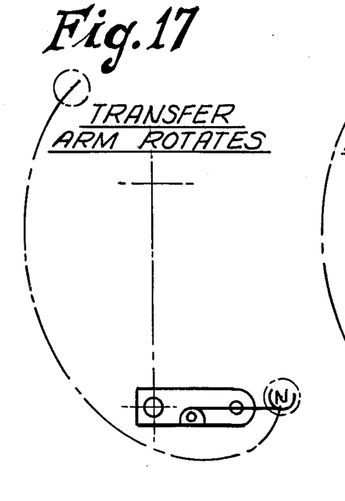
Figures 18, 19:
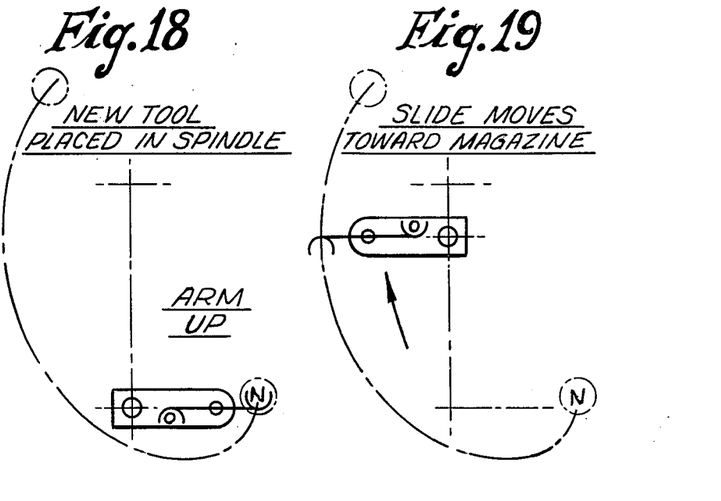

The drawbar of the spindle 18 now releases the old tool therein whereupon the transfer arm support 26 is lowered (by hydraulic pressure as previously set forth) to withdraw the old tool from the spindle, as is shown in FIG. 16. The transfer arm 28 is then rotated clockwise about the wrist (the axis of shaft 74) through an angle of 180° to the position of FIG. 17 in order to place the new tool in alignment with the spindle 18. The aforementioned rotation about the wrist was, of course, beget by the actuation of the hydraulic cylinder 80. The transfer arm support 26 is now moved upwardly such that the new tool is placed in the spindle 18 (FIG. 18). Next, the power drawbar locks the tool in the spindle, thereby completing the tool change. The tool transfer assembly 22 is now ready to begin its rearward trip back to the magazine 23 with the inboard gripper of the transfer arm 28 holding the old tool.

Figure 20:
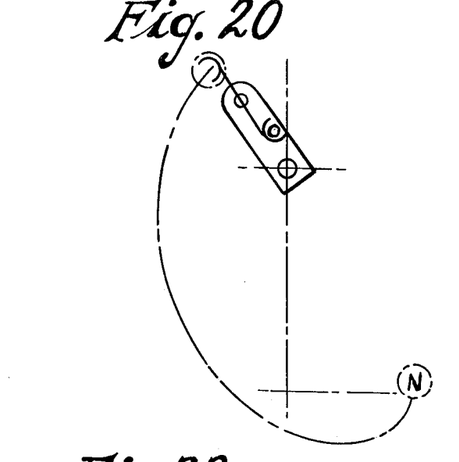
Figure 21:
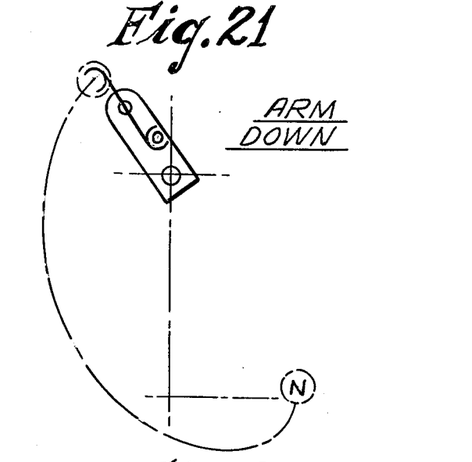
Figure 22:
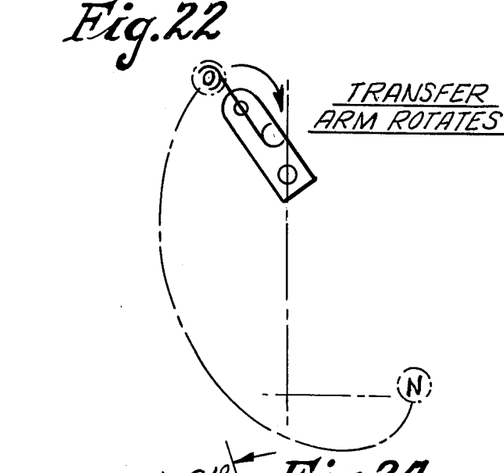

The air cylinder 132 is again actuated to produce rearward movement 22 of the tool transfer assembly 22 with its attendant pivoting of the transfer arm support 26. Such rearward movement causes the gripper holding the new tool, which is now secured in the spindle 18, to disengage therefrom. From FIG. 19, it will be seen that the path of movement traversed by the outer empty gripper in traveling back to the magazine 23 is the same as that previously traversed by the now inboard gripper in movement toward the spindle 18. FIG. 20 shows the tool transfer assembly 22 back in the park position with the outer empty gripper stationed under the empty tool carrier and the inboard gripper grasping the old tool. At this time, the machine may resume its work without any interference between the machining operation and the subsequently described tool transfers at the magazine.

Figure 23:
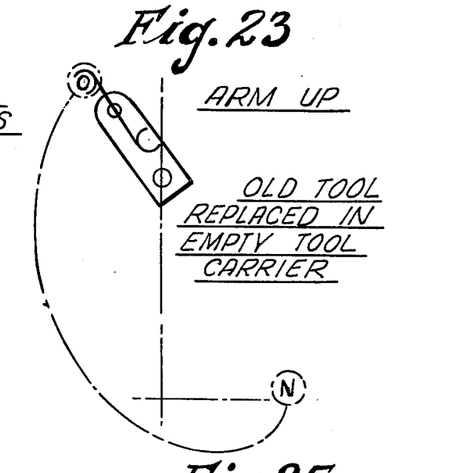
Figure 24:
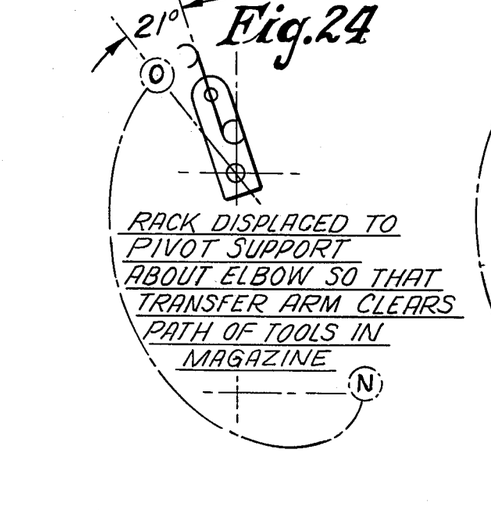

The old tool must now be inserted back into the magazine. To this end, the transfer arm support 26 is moved downwardly (FIG. 21); and, the transfer arm is rotated clockwise 180° (the opposite direction of the last rotation) whereby the old tool is in the position of FIG. 22, which is a position of alignment with the empty tool carrier disposed thereabove. The transfer arm support 26 is then moved upwardly so as to insert the old tool in the empty tool carrier at the transfer station. FIG. 23 shows the old tool remounted in its carrier but still secured by the outboard gripper. Obviously, the transfer arm 28 at the park position of FIG. 23 lies in the path of travel of the tools in the magazine 23 and must be removed therefrom before a new tool search can be conducted.

Figure 25:
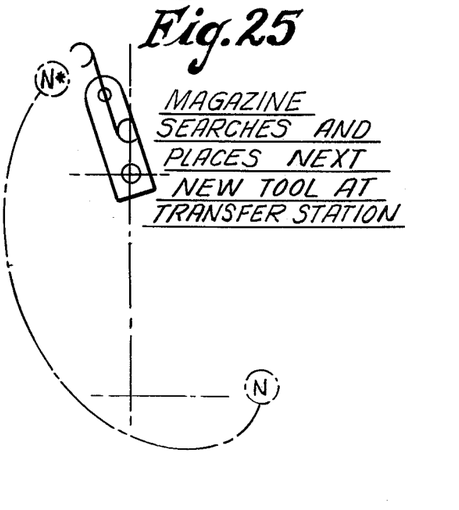
Figure 26:
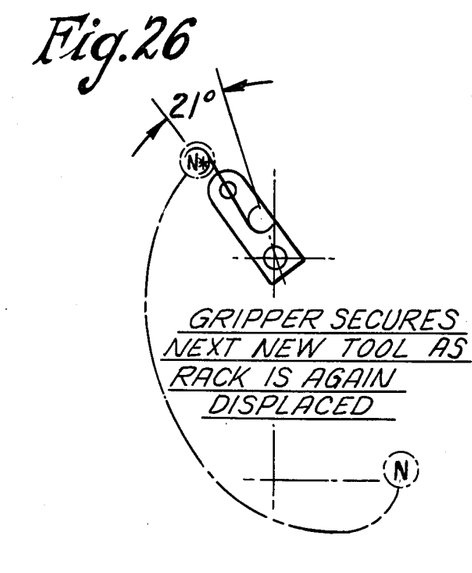
Figure 27:
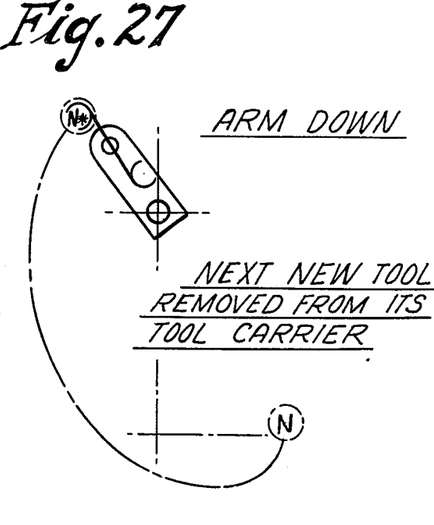
Figure 28:
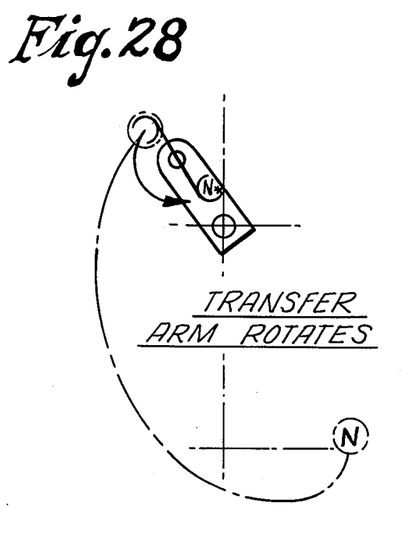
Figure 29:
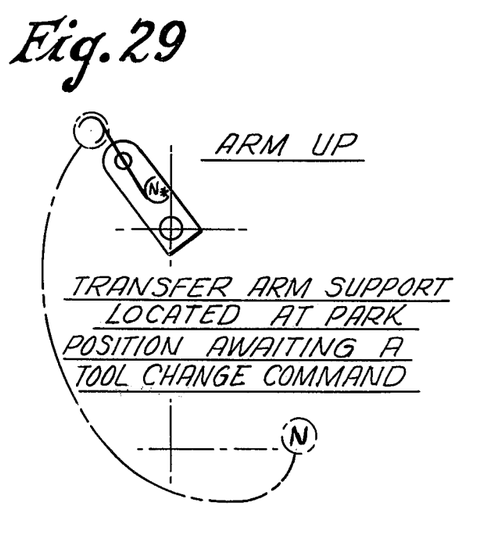

When the air cylinder 142 is actuated, the normally stationary rack 44 is pushed forwardly, thereby causing the pinion 46 to rotate. The carriage 34 is, of course, held against movement by the air cylinder 132. This latter pinion rotation produces a 21° pivoting of the transfer arm support 26, about the now fixedly positioned elbow, to the position of FIG. 24 wherein the magazine can search for and place the next new tool at the transfer station (FIG. 25). Next, as depicted in FIG. 26, the transfer arm support 26 is caused to pivot counterclockwise about the elbow through an angle of 21°, whereby the outboard gripper secures the next new tool by engaging its gripper flange. This latter pivoting motion is beget by the cylinder 142 pulling the rack backwardly to its original position. Next, the transfer arm support 26 is moved downwardly to withdraw the latter mentioned new tool from its carrier (FIG. 27) and the transfer arm 28 is rotated counterclockwise through an angle of 180° (FIG. 28) so as to place the empty gripper in an outboard location. Finally, in FIG. 29, the transfer arm support 26 is moved upwardly, whereby the park position is again assumed and a new tool change command awaited.

It should be noted that the illustrated transfer arm only rotates bidirectionally through an arc of 180° and that there are three rotations per tool change cycle due to the cylinder and pinion arrangement. Hence, it will be appreciated that the sense of rotation of the transfer arm at the spindle during the next tool change will be clockwise and not counterclockwise as shown in FIG. 17. The senses of other arm rotations in the next tool change cycle will be similarly affected. Moreover, with regard to transfer arm rotations, it will be noted that only one of the three rotations takes place at the spindle, thereby to minimize tool change time.

Obviously, many modifications and variations are possible in light of the above teachings without departing from the scope or spirit of the invention, as defined in the appended claims. For example, the extent of angular pivoting of the transfer arm support is subject to a wide variation and could be more or less than the 235° illustrated and could even be less than 180° without sacrificing the advantages of the invention. Moreover, the specific means for importing pivoting movement to the transfer arm support during its travel could be achieved by other mechanical elements or electric motors. In addition, the 21° pivoting movement could be dispensed with if a different form of tool storage magazine or arrangement were provided (e.g., an industrial robot utilized to transfer tools between a storage device and the transfer arm or a magazine having the capacity to place and withdraw tools from a gripper).

We claim:

1. In an automatic tool changer for a vertical spindle machining center having a column, a head mounted upon the column for vertical movement with respect thereto and a vertical spindle journaled in the head, which tool changer is of the type comprising: a tool storage magazine adapted to selectively present tools to a tool transfer station and a tool transfer arm having a pair of tool grippers adapted to grasp tools at the tool transfer station and the spindle, the improvement comprising:

a slide assembly mounted upon a side of the column for sliding movement between a rearward position adjacent the tool transfer station and a forward position adjacent the spindle;

a transfer arm support mounted upon the slide assembly for pivoting movement with respect thereto, the slide assembly including a mechanism for respectively imparting oppositely directed pivoting movements to the transfer arm support during forward and rearward movement of the slide assembly, the tool transfer arm being mounted upon the transfer arm support for rotation with respect thereto between two index positions about an axis spaced from and parallel to the axis of pivoting of the transfer arm support, the transfer arm support being of a sufficient length and pivotable through a sufficient angle to permit a gripper to grasp a tool in the spindle when the slide assembly is in forward position.

2. The improvement of claim 1 further comprising:
a frame mounted upon the side of the column;
a track connected to the frame, the slide assembly being attached to the track for movement therealong;
a rack attached to the frame; and wherein the mechanism comprises:
a gear train operatively connected to the rack for imparting pivoting movement to the transfer arm support.

3. The improvement of claim 2, further comprising:
means to axially displace the rack with respect to the frame when the slide assembly is in the rearward position for pivoting the transfer arm support such that the transfer arm may be moved away from the tool transfer station and subsequently moved into the tool transfer station.

4. The improvement of claim 2, wherein the slide assembly further comprises:

means to raise and lower the transfer arm support for transferring tools at the tool transfer station and at the spindle.

5. The improvement of claim 2, wherein pivoting movement of the transfer arm support causes the transfer arm to move in a cycloidal path during forward and rearward movement of the slide assembly.

6. In an automatic tool changer for a vertical spindle machining center having a column, a head mounted upon the column for vertical movement with respect thereto and a vertical spindle journaled in the head, which tool changer is of the type which includes: magazine means to present a tool to a remote tool transfer station spaced from the machining center; a tool transfer arm having two grippers for transporting tools between the spindle and the tool transfer station and a transfer arm support upon which the tool transfer arm is mounted, the improvement comprising:

frame means attached to a side of the column;
track means extending along the side of the machining center attached to the frame means;
carriage means mounted upon the track means for reciprocating movement between forward and rearward positions; and
means interconnecting the carriage means and the transfer arm support for producing pivoting movement of the transfer arm support about a vertical axis during movement of the carriage means such that the transfer arm moves in a cycloidal path.

7. The improvement of claim 6, wherein the interconnecting means further comprises:

means to raise and lower the transfer arm support for transferring tools at the spindle and at the tool transfer station and wherein the improvement further includes:
means to rotate the transfer arm about a vertical axis spaced from the axis of pivoting of the transfer arm support.

8. The improvement of claim 6, further including:

means to produce pivoting movement of the transfer arm support when the carriage means is in the rearward position for moving the transfer arm away from and subsequently into the tool transfer station.

9. An automatic tool changer for a vertical spindle machining center having a column, a head mounted upon the column for vertical movement and a vertical spindle journaled therein comprising:

a tool storage magazine floor mounted in spaced relationship to the machining center having a tool transfer station located to the side and rear of the column;
a frame mounted upon the side of the column;
a track extending along the side of the column connected to the frame;
a rack extending along the side of the column supported by the frame for limited axial movement with respect thereto between normal and displaced positions;
a carriage mounted upon the track for reciprocating movement between forward and rearward positions;
a gear box including a gear train attached to the carriage for movement therewith;
a pinion mounted upon the gear box and operatively associated with the gear train in meshing engagement with the rack;
a transfer arm support mounted upon the gear box for vertical movement between up and down positions and for pivoting movement with respect thereto about a vertical axis, the transfer arm support being operatively connected to the gear train such that rotation of the pinion during carriage movement produces a pivoting movement of the transfer arm support through an angle proportional to the extent of carriage movement;
a tool transfer arm having two diametrically opposed grippers mounted for rotation between two index positions upon the transfer arm support about a vertical axis spaced from the axis of pivoting of the transfer arm support, a gripper of the transfer arm support being located at the tool transfer station when the carriage is in the rearward position, the transfer arm is in the up position, the transfer arm is in an index position and the rack is in the normal position; and the extent of pivoting of the transfer arm support during movement of the carriage into forward position being such that the latter mentioned gripper may secure a tool in the spindle in the forward position of the carriage while the transfer arm remains in fixed position with respect to the transfer arm support during carriage movement; and
means to move the rack from its normal position to its displaced position so that the transfer arm may be moved away from the tool transfer station when the carriage is in its rearward position.

* * * * *